US012585230B2

(12) United States Patent
Hasebe et al.

(10) Patent No.: US 12,585,230 B2
(45) Date of Patent: Mar. 24, 2026

(54) TIMEPIECE MODULE AND ELECTRONIC TIMEPIECE

(71) Applicant: CASIO COMPUTER CO., LTD., Tokyo (JP)

(72) Inventors: Kyohei Hasebe, Saitama (JP); Daisuke Ikeda, Hamura (JP); Shinya Cho, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 377 days.

(21) Appl. No.: 18/457,802

(22) Filed: Aug. 29, 2023

(65) Prior Publication Data

US 2024/0069498 A1 Feb. 29, 2024

(30) Foreign Application Priority Data

Aug. 30, 2022 (JP) ................................ 2022-136454

(51) Int. Cl.

| | |
|---|---|
| ***G04G 21/04*** | (2013.01) |
| ***G04G 17/04*** | (2006.01) |
| ***H01Q 1/27*** | (2006.01) |

(52) U.S. Cl.

CPC ............ *G04G 21/04* (2013.01); *G04G 17/04* (2013.01); *H01Q 1/273* (2013.01)

(58) Field of Classification Search

None

See application file for complete search history.

(56) References Cited

U.S. PATENT DOCUMENTS

| | | | | |
|---|---|---|---|---|
| 6,762,728 B2 * | 7/2004 | Koyama | H01Q 9/0421 343/718 |
| 11,237,526 B2 * | 2/2022 | Kita | H01Q 9/26 |
| 2009/0207083 A1 | 8/2009 | Miyazaki et al. | |
| 2019/0379105 A1 * | 12/2019 | Sayem | H01Q 1/273 |

FOREIGN PATENT DOCUMENTS

| | | |
|---|---|---|
| JP | 2015510303 A | 4/2015 |
| JP | 2017083229 A | 5/2017 |
| JP | 2017122659 A | 7/2017 |
| WO | 2007108502 A1 | 9/2007 |

OTHER PUBLICATIONS

Notice of Reasons for Refusal dated Jul. 23, 2024 received in Japanese Patent Application No. 2022-136454.

Extended European Search Report dated Feb. 12, 2024 received in European Patent Application No. EP 23191847.5.

Decision of Refusal dated Dec. 3, 2024 received in Japanese Patent Application No. 2022-136454.

* cited by examiner

*Primary Examiner* — Regis J Betsch

*Assistant Examiner* — Michael James Walker

(74) *Attorney, Agent, or Firm* — Scully, Scott, Murphy & Presser, P.C.

(57) ABSTRACT

A timepiece module includes a digital display screen, an antenna device and a metallic component. The antenna device includes an antenna pattern relevant to communication and an antenna component connected to and extending from the antenna pattern. In a plan view, the antenna pattern has a curved shape and overlaps the digital display screen. The antenna device is disposed such that either one side or other side on a virtual line does not overlap the metallic component. The virtual line is an extending direction in which the antenna component, which extends from the antenna pattern, extends.

20 Claims, 1 Drawing Sheet

TIMEPIECE MODULE AND ELECTRONIC TIMEPIECE

REFERENCE TO RELATED APPLICATIONS

This application is based upon and claims the benefit of priority from the prior Japanese Patent Application No. 2022-136454, filed on Aug. 30, 2022, the entire contents of which are incorporated herein by reference.

TECHNICAL FIELD

The present disclosure relates to a timepiece module and an electronic timepiece.

DESCRIPTION OF RELATED ART

An electronic timepiece capable of receiving radio waves and performing communication has an antenna that is used for transmitting/receiving radio waves. If this antenna suffers interference from another metallic component(s) or the like, it becomes difficult for the antenna to transmit/receive radio waves with a proper sensitivity. Therefore, the antenna's position is determined in relation to another metallic component(s) such that the transmission/reception sensitivity decreases as little as possible.

SUMMARY OF THE INVENTION

According to an aspect of the present disclosure, there is provided a timepiece module including:

a digital display screen;

an antenna device including an antenna pattern relevant to communication and an antenna component connected to and extending from the antenna pattern; and a metallic component, wherein, in a plan view, the antenna pattern has a curved shape and overlaps the digital display screen, and wherein the antenna device is disposed such that either one side or other side on a virtual line that is an extending direction in which the antenna component, which extends from the antenna pattern, extends does not overlap the metallic component.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of the present disclosure will be described with reference to the drawings.

Figure 1:
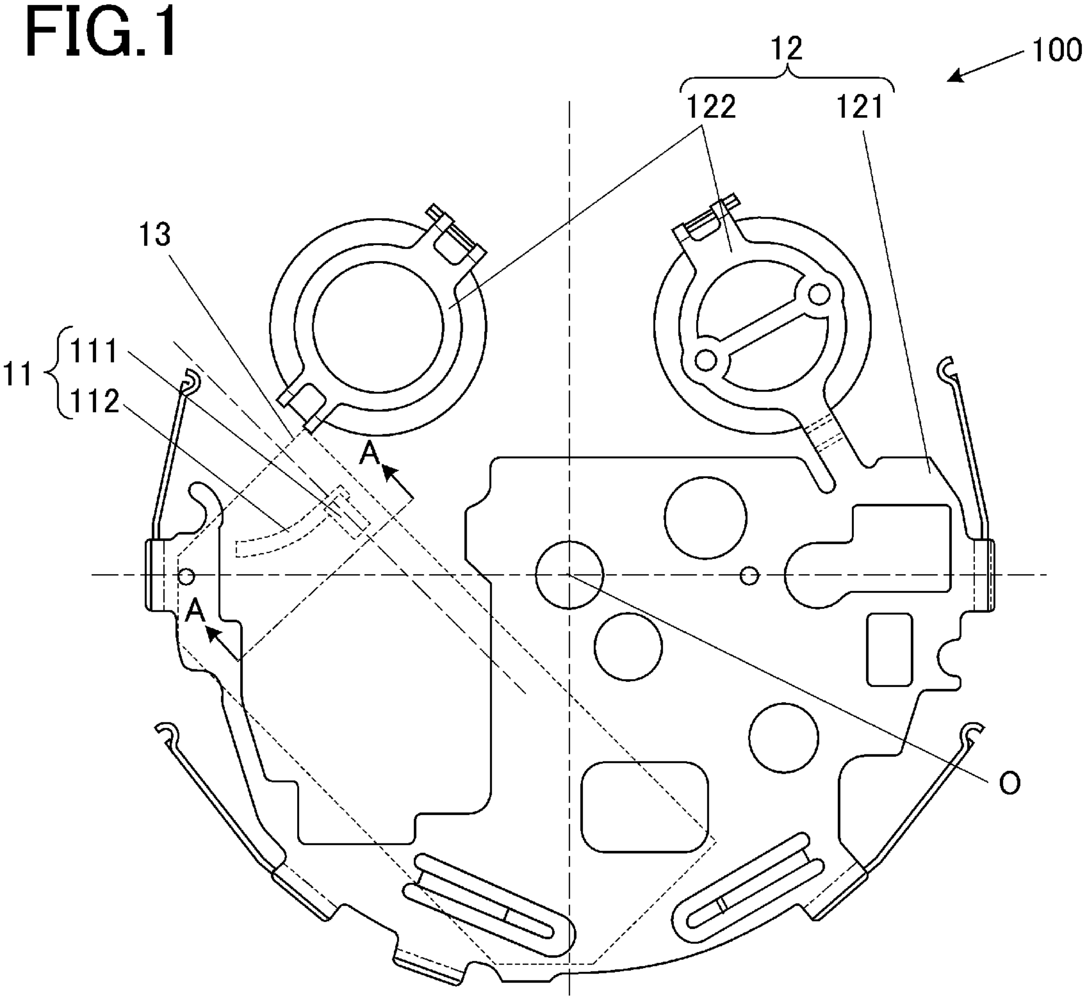
FIG. 1 is a bottom view to explain a position of an antenna device in a timepiece module.
Figure 2:
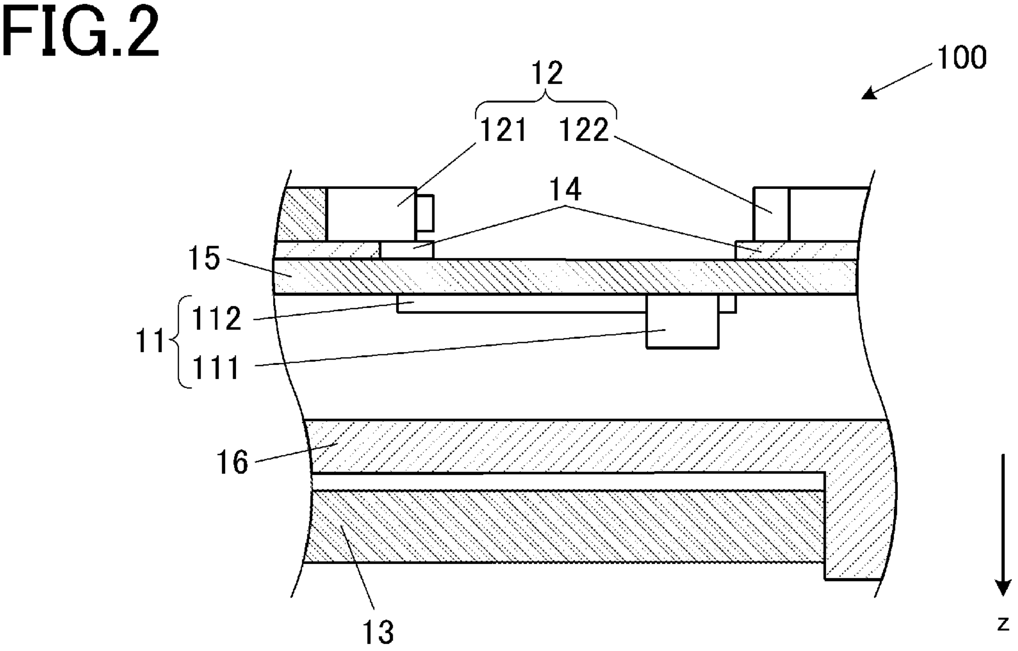
FIG. 2 is a sectional view of the timepiece module.

FIG. 1 is a bottom view to explain a position of an antenna device 11 in a timepiece module 100 of an embodiment(s). FIG. 2 is a sectional view of the timepiece module 100 taken along line A-A in FIG. 1.

In FIG. 1, positions of the antenna device 11 and a liquid crystal display screen 13 (digital display screen) in relation to a metallic component 12 are indicated by broken lines. An electronic timepiece that uses the timepiece module 100 is, for example, an electronic timepiece having both a hand-type display and a liquid crystal display. In this embodiment, as shown in FIG. 1, the liquid crystal display screen 13 is at the lower left with respect to the center position O that is the rotation axis of not-shown hands. Since FIG. 1 is a bottom view of the timepiece module 100, which is used in an electronic timepiece, namely, is an illustration viewed from the back side, the region that the liquid crystal display screen 13 mainly occupies is a region for three o'clock to six o'clock. As shown in FIG. 2, the liquid crystal display screen 13 is fixed by a resin component 16. The liquid crystal display screen 13 performs digital representation with a dot matrix, for example.

Conventionally, even if an antenna that receives satellite signals is disposed under a liquid crystal display screen, the antenna is disposed so as to overlap the liquid crystal display screen as little as possible, for example, at display electrodes and part of connection wiring only.

However, there are some cases where it is difficult to adjust the position of an antenna in relation to a display screen having a large number of display pixels, for example.

In order to deal with such cases, there will be described hereinafter a timepiece module and an electronic timepiece capable of suppressing decrease in the transmission/reception sensitivity of an antenna even if the antenna is disposed under a display screen.

The antenna device 11 has an antenna component 111 and an antenna pattern 112 (antenna element). As shown in FIG. 1, the antenna component 111 is connected to and extends from the antenna pattern 112 relevant to communication. The antenna pattern 112 may be a monopole antenna (inverted-L antenna, etc. included) having a gentle circular arc shape (curved shape) with a large curvature radius in relation to its length in a plan view from above the liquid crystal display screen 13 (+z side in FIG. 2) (as a see-through shape if the antenna pattern 112 cannot be seen in part or at all in the plan view by being hidden/covered by another component(s) or the like). Hence, the actual length of the antenna pattern 112 is slightly (a few percent to a few tens of percent) longer than a length corresponding to the wavelength of a frequency for transmission/reception (i.e., for both or one of transmission and reception) of radio waves (frequency to be used). The length corresponding to the wavelength of the frequency to be used is, for example, ⅛ of the wavelength of the frequency. This increase in the length expands the area where radio waves can be transmitted/received by the antenna device 11, thereby improving the sensitivity of the antenna device 11, while not greatly changing the radio wave transmission/reception frequency. In this embodiment, the antenna device 11 is used for short-range wireless communication, in particular, 2.4 GHz band communication by Bluetooth®.

The antenna device 11 is subjected to trimming setting, so that the transmission/reception frequency can be adjusted. The trimming setting adjusts the capacitance of a not-shown capacitor disposed in the timepiece module 100, thereby trimming the aforementioned increase in the length of the antenna pattern 112 and adjusting the transmission/reception frequency.

Although not particularly limited, in the plan view from above the liquid crystal display screen 13, the antenna component 111 is, for example, rectangular, and disposed near an end of the antenna pattern 112 so as to protrude from a plane containing the antenna pattern 112. The antenna component 111 is disposed such that its lengthwise direction is perpendicular to a contact surface with the antenna pattern 112, which corresponds to the aforementioned plane. As shown in FIG. 2, the antenna component 111 is connected and fixed to a substrate 15, and exchanges transmission/reception data with a signal line(s) of the substrate 15.

As shown in FIG. 1, the antenna device 11 is disposed under the liquid crystal display screen 13 in the plan view. Even in this case, it is preferable that the antenna device 11 be disposed as close to the edge (outer edge) of the timepiece module 100 as possible. As a result, the antenna device 11 is located slightly inside the edge of the timepiece module 100. Around the antenna device 11, a distance (clearance) is provided with respect to the metallic component 12 in order to reduce interference in transmission/reception of radio waves.

In this embodiment, the metallic component 12 includes a pressing member 121 that fixes the entire timepiece module 100 inside a case of the electronic timepiece and fixing members 122 each of which is for fixing a battery or the like at its proper position. Objects that are fixed by the pressing member 121 include the substrate 15 and a housing.

The housing includes the resin component 16. The housing houses components for digital representation, such as the liquid crystal display screen 13, and components for analog representation, such as hands, a gear train (gear train mechanism) and a stepping motor. The metallic component 12 includes plate springs or the like that produce elastic stress for pushbutton switches disposed on the lateral surface of the electronic timepiece. The metallic component 12 may also function as a case ground plane and be electrically connected to a ground plane on the substrate 15. The metallic component 12 may further include screws, springs and batteries, which are not shown. The batteries may each be a button cell or a rechargeable battery.

In FIG. 1, the line A-A, along which the sectional view shown in FIG. 2 is taken, extends perpendicularly to the lengthwise direction of the antenna component 111. The timepiece module 100 is configured such that, at this line A-A, the liquid crystal display screen 13, the resin component 16, the antenna device 11, the substrate 15, an insulation sheet 14 and the metallic component 12 are piled in this order from the lower side in FIG. 2, namely, from the upper side of the timepiece module 1 (+z direction).

The pressing member 121 of the metallic component 12 in FIG. 2 is a part thereof located at the left of the antenna pattern 112 in FIG. 1, and the fixing member 122 of the metallic component 12 in FIG. 2 is a part thereof located at the upper right of the antenna pattern 112 in FIG. 1. The hatched regions in FIG. 2 show sections of members or the like concerned. The unhatched regions in FIG. 2 show that members or the like concerned, which include the insulation sheet 14, the pressing member 121 and the fixing member(s) 122, are in part or wholly located behind the section taken along the line A-A. A convex part located at the right of the pressing member 121 in FIG. 2 is a plate spring located at the upper left among four plate springs shown in FIG. 1.

On the substrate 15, various electronic components for causing the electronic timepiece to operate may be mounted. Examples thereof include an IC chip, a large-capacitance capacitor, a crystal oscillator, a physical sensor and a communication control (which may include modulation and demodulation) circuit. The substrate 15 also has wiring that connects the electronic components with one another and the ground plate. Although not particularly limited, the substrate 15 may be a multi-layer substrate, which is formed of multiple layers.

The insulation sheet 14 prevents the metallic component 12 and so forth from contacting the wiring or the ground plane on the substrate 15, thereby preventing short-circuiting. The insulation sheet 14 includes a region that is on the metallic component 12 in the plan view, and is provided along the periphery of the metallic component 12 so as to be slightly larger than the metallic component 12 in area.

The direction indicated by a dash-dot-dash line in FIG. 1 along the lengthwise direction of the antenna component 111, namely, the direction perpendicular to the plane shown in FIG. 2, is a representative direction of directions in which radio waves radiate from the antenna pattern 112 and/or directions in which radio waves are incident on the antenna pattern 112. In the timepiece module 100, the metallic component 12 is not located on an extension line of the antenna component 111 at the outward side of the antenna component 111 ((outer) peripheral side of the timepiece module 100). The metallic component 12 is located at the right and the left of the extension line of the antenna component 111 at the outward side of the antenna component 111. In this embodiment, in the outward direction perpendicular to each point on the lateral surface (on the peripheral side of the timepiece module 100 or the curvature center side of the antenna pattern 112) of the curved antenna pattern 112, the metallic component 12 is not present, namely, there is a region free from the metallic component 12. In other words, the antenna device 11 is disposed such that either one side or the other side on a virtual line (dash-dot-dash line in FIG. 1) that is an extending direction in which the antenna component 111 extending from the antenna pattern 112 extends does not overlap the metallic component 12. In this embodiment, between the one side and the other side on the virtual line, the side that does not overlap the metallic component 12 is the peripheral side of the timepiece module 100.

The antenna pattern 112 and the pressing member 121 have a positional relationship with which they are closest (have the shortest distance) to one another at one end of the antenna pattern 112. This shortest distance is determined to be a reference value or greater. In this embodiment, the reference value is 0.6 mm to 0.7 mm. Securing a space of a certain distance (reference distance/value or greater) between the antenna pattern 112 and the pressing member 121 at an end of the antenna pattern 112 too, namely, separating the antenna pattern 112 from the pressing member 121 by a certain distance, can suppress interference from the metallic component 12 in transmission/reception of radio waves.

It is noted that metallic constituents or the like of the wiring, the ground plane and the electronic components on the substrate 15 are not included in the metallic component 12 of this embodiment. However, it is preferable that these be also not in the aforementioned region whenever possible. Those that are difficult to be excluded from the region, such as the signal line that connects with the antenna component 111, are disposed in the region though.

In this embodiment, the insulation sheet 14 is not provided in the region free from the metallic component 12. However, since the insulation sheet 14 does not interfere with radio waves, it is unnecessary to avoid providing the insulation sheet 14 in the region. The insulation sheet 14 may spread along the substrate 15 in the region too.

The electronic timepiece of this embodiment is configured such that the timepiece module 100 is housed in an exterior member (case or bezel), and its upper side and lower side are covered and sealed with a crystal and a back cover, respectively. The aforementioned pushbutton switches or the like pass through and protrude from the lateral surface of the exterior member, and move the plate springs of the metallic component 12 inside the exterior member by receiving input operations from the outside. The timepiece module 100 detects the input operations and operates in accordance with the input operations.

As described above, the timepiece module 100 of this embodiment includes the liquid crystal display screen 13, the antenna device 11 including the antenna pattern 112 relevant to communication and the antenna component 111, and the metallic component 12. In a plan view, the antenna pattern 112 has a curved shape and overlaps the liquid crystal display screen 13. The antenna device 11 is disposed such that either one side or the other side on a virtual line that is the extending direction in which the antenna component 111 extends does not overlap the metallic component 12.

This structure can suppress interference between the metallic component 12 and the antenna pattern 112 and suppress decrease in the transmission/reception sensitivity even if there is no choice but to place the antenna device 11 at a position where the antenna device 11 is covered with the liquid crystal display screen 13 or the like from above. Thus, the timepiece module 100 has a higher degree of freedom in arrangement of the antenna element 11 and so forth therein. Hence, the timepiece module 100 can have components for many functions more efficiently.

Further, the antenna component 111 is rectangular in the plan view, and its extending direction is its lengthwise direction. Between the one side and the other side on the virtual line, the side that does not overlap the metallic component 12 is the peripheral side of the timepiece module 100.

In other words, disposing the antenna device 11 so as not to overlap the metallic component 12 at the peripheral side, from which radio waves are likely to enter/exit, can further improve the radio wave transmission/reception sensitivity of the timepiece module 100.

Further, the antenna pattern 112 may be longer than a length corresponding to the wavelength of a frequency to be used. The antenna pattern 112 having the aforementioned curved shape can be slightly longer than an antenna pattern having the same width as the antenna pattern 112 but a linear shape. Trimming the extended amount of the length with the capacitor can keep a tuning frequency at a desired frequency to be used, and improve the transmission/reception sensitivity of the timepiece module 100.

Further, the frequency to be used may be a frequency that is used for short-range wireless communication, in particular, Bluetooth. In other words, the antenna device 11 may be the one that is used for short-range wireless communication. The present disclosure is suitably applicable to, as in the 2.4 GHz band, cases where an antenna having an almost linear shape in a plan view can be arranged in the timepiece module 100.

Further, it is preferable that the metallic component 12 be a reference distance or greater away from the antenna pattern 112. The metallic component 12 not only being free from a region on the extension line of the antenna component 111 but also keeping a certain distance from the antenna pattern 112, namely, keeping a distance from the antenna device 11 as a whole, can effectively suppress interference in transmission/reception of radio waves.

Further, the curved shape of the antenna pattern 112 may be a circular arc shape. Not bending the antenna pattern 112 too much or too complicatedly can suppress decrease in the transmission/reception efficiency, gain the antenna length and improve the transmission/reception sensitivity.

Further, the electronic timepiece of this embodiment includes the timepiece module 100 described above. This can suppress increase in the size of the electronic timepiece and decrease in the radio wave transmission/reception sensitivity, and allows the electronic timepiece to have components for many functions more efficiently.

The present disclosure is not limited to the above embodiment and hence can be modified in a variety of respects.

For example, in the above embodiment, the short-range wireless communication is Bluetooth communication, but may be, in the same frequency band, Wi-Fi communication or communication in compliance with another communication standard.

Further, the antenna pattern 112 may not be a circular arc shape in a plan view. The antenna pattern 112 may be a shape of part of another curve, such as a quadratic curve or a hyperbola.

Further, in the above embodiment, the digital display screen is the liquid crystal display screen 13, but not limited thereto. The digital display screen may be an organic LE (Electro-Luminescent) screen or the like. The digital display screen is not even limited to a display that performs representation using a dot matrix system.

Further, the wideness of a space (region) free from the metallic component 12 at the other side in the extending direction of the antenna components 111 (the other side on the virtual line), namely, at the inner side of the timepiece module 100, may be determined appropriately.

Further, in the above embodiment, the antenna pattern 112 has the shortest distance to the metallic component 12 at its one end, but is not limited thereto. For example, the antenna pattern 112 may have the shortest distance to the metallic component 12 at a point on its upper side or lower side.

Further, the position where the antenna device 11 overlaps the liquid crystal display screen 13 is not limited to the one described in the above embodiment. This position may be determined in relation to the electronic components, the metallic component 12 and so forth.

The specific components, configuration, structure, positional relationships and so forth described in the above embodiment can be appropriately changed without departing from the scope of the present disclosure. The scope of the present disclosure includes the scope of claims below and the scope of their equivalents.

The invention claimed is:

1. A timepiece module comprising:

a digital display screen;

an antenna device including an antenna pattern relevant to communication and an antenna component connected to and extending from the antenna pattern; and a metallic component, wherein, in a plan view, the antenna pattern has a curved shape and overlaps the digital display screen, and wherein the antenna device is disposed such that either one side or other side on a virtual line that is an extending direction in which the antenna component, which extends from the antenna pattern, extends does not overlap the metallic component.

2. The timepiece module according to claim 1, wherein the antenna component is rectangular in the plan view.

3. The timepiece module according to claim 2, wherein the extending direction of the antenna component is a lengthwise direction of the antenna component.

4. The timepiece module according to claim 3, wherein, between the one side and the other side on the virtual line, a side that does not overlap the metallic component is a peripheral side of the timepiece module.

5. The timepiece module according to claim 1, wherein the antenna device is used for short-range wireless communication.

6. The timepiece module according to claim 2, wherein the antenna device is used for short-range wireless communication.

7. The timepiece module according to claim 3, wherein the antenna device is used for short-range wireless communication.

8. The timepiece module according to claim 4, wherein the antenna device is used for short-range wireless communication.

9. The timepiece module according to claim 1, wherein the antenna pattern is longer than a length corresponding to a wavelength of a frequency to be used.

10. The timepiece module according to claim 2, wherein the antenna pattern is longer than a length corresponding to a wavelength of a frequency to be used.

11. The timepiece module according to claim 3, wherein the antenna pattern is longer than a length corresponding to a wavelength of a frequency to be used.

12. The timepiece module according to claim 4, wherein the antenna pattern is longer than a length corresponding to a wavelength of a frequency to be used.

13. The timepiece module according to claim 9, wherein the frequency to be used is a frequency for short-range wireless communication.

14. The timepiece module according to claim 10, wherein the frequency to be used is a frequency for short-range wireless communication.

15. The timepiece module according to claim 11, wherein the frequency to be used is a frequency for short-range wireless communication.

16. The timepiece module according to claim 12, wherein the frequency to be used is a frequency for short-range wireless communication.

17. The timepiece module according to claim 1, wherein the metallic component is a reference distance or greater away from the antenna pattern.

18. The timepiece module according to claim 1, wherein the curved shape is a circular arc shape.

19. An electronic timepiece comprising the timepiece module according to claim 1.

20. An electronic timepiece comprising the timepiece module according to claim 4.

* * * * *